United States Patent [19]

Shustorovich

[11] Patent Number: 5,684,894
[45] Date of Patent: Nov. 4, 1997

[54] SCALE SPECIFIC AND ROBUST LINE/EDGE ENCODING OF IMAGES

[75] Inventor: Alexander Shustorovich, Rochester, N.Y.

[73] Assignee: Eastman Kodak Company, Rochester, N.Y.

[21] Appl. No.: 345,101

[22] Filed: Nov. 28, 1994

[51] Int. Cl.⁶ .............................. G06K 9/48; G06K 9/32; H04N 7/12

[52] U.S. Cl. .................... 382/232; 382/199; 382/248; 382/291; 348/403

[58] Field of Search .................................. 382/174, 248, 382/199, 206, 207, 291, 232; 348/403

[56] References Cited

U.S. PATENT DOCUMENTS

| | | | |
|---|---|---|---|
| 4,553,260 | 11/1985 | Belt et al. | 382/22 |
| 4,791,677 | 12/1988 | Mori et al. | 382/41 |
| 4,803,736 | 2/1989 | Grossberg et al. | 382/22 |
| 4,905,296 | 2/1990 | Nishihara | 382/42 |
| 4,918,742 | 4/1990 | Simonds | 382/41 |
| 5,027,419 | 6/1991 | Davis | 382/28 |
| 5,109,425 | 4/1992 | Lawton | 382/1 |
| 5,142,592 | 8/1992 | Moler | 382/22 |
| 5,151,822 | 9/1992 | Hekker et al. | 359/559 |
| 5,170,440 | 12/1992 | Cox | 382/22 |
| 5,173,949 | 12/1992 | Peregim et al. | 382/199 |
| 5,321,776 | 6/1994 | Shapiro | 382/248 |
| 5,398,067 | 3/1995 | Sakamoto | 348/403 |
| 5,453,945 | 9/1995 | Tucker et al. | 382/251 |
| 5,491,561 | 2/1996 | Fukuda | 348/398 |
| 5,495,292 | 2/1996 | Zhang et al. | 348/407 |
| 5,495,554 | 2/1996 | Edwards et al. | 364/485 |

*Primary Examiner*—Andrew Johns
*Assistant Examiner*—Monica S. Davis
*Attorney, Agent, or Firm*—Charles E. Wands

[57] ABSTRACT

Prescribed attributes such as lines and edges are detected in an image wherein the image is digitized to a prescribed spatial and a digital encoding resolution. Directional energy and positions of linear structures in the image are then estimated, and global and local normalization of the linear structures are performed. Spatial and directional competition is conducted among the linear structures and winners of this competition are determined. The winners are encoded into strings of digital data words, with the encoded winners forming a structural description of the original image. The encoded structural description of the original image can be stored and used in other image processing algorithms, such as those used for pattern recognition.

14 Claims, 7 Drawing Sheets

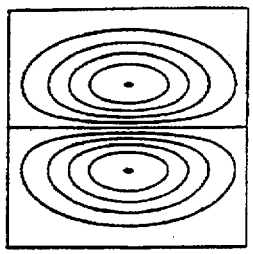 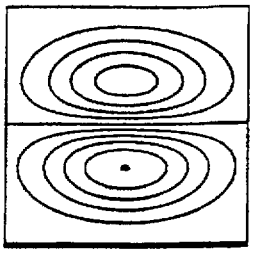 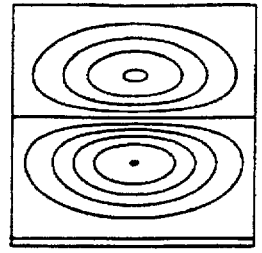 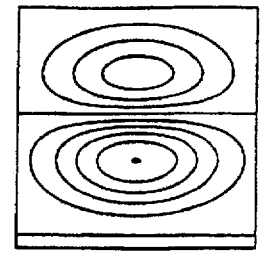
FIG.1A  FIG.1B  FIG.1C  FIG.1D
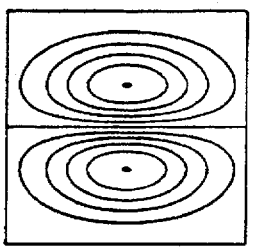 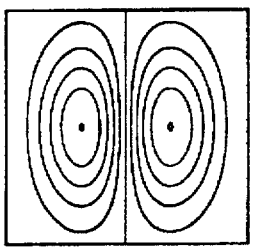 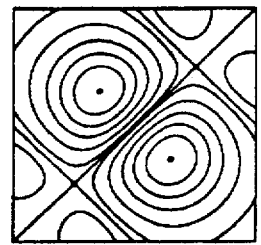 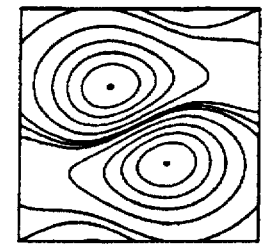
FIG.2A  FIG.2B  FIG.2C  FIG.2D
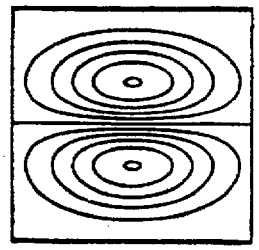 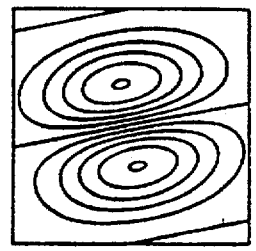 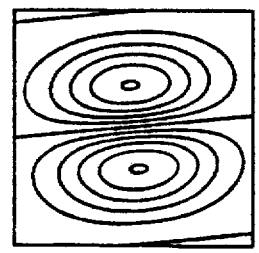 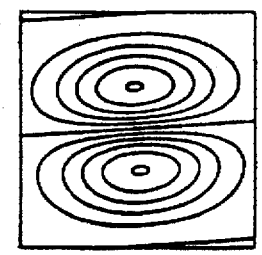
FIG.3A  FIG.3B  FIG.3C  FIG.3D

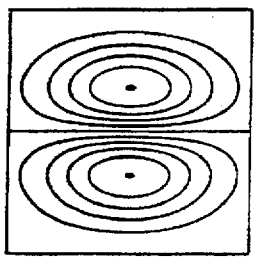 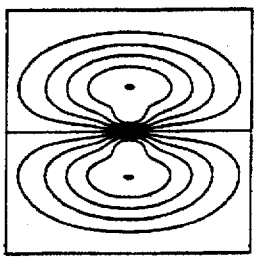 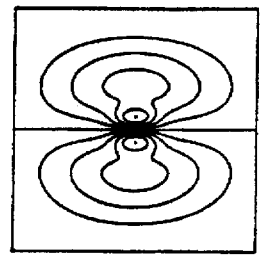 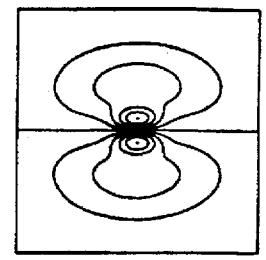
FIG.4A  FIG.4B  FIG.4C  FIG.4D
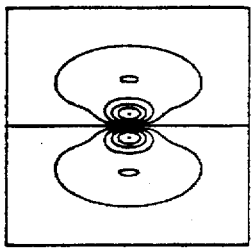 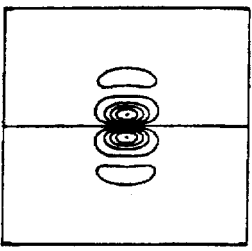 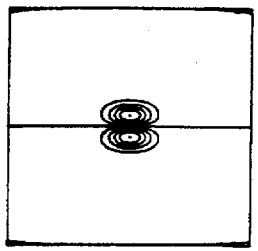 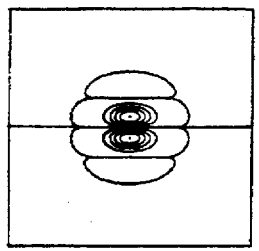
FIG.4E  FIG.4F  FIG.4G  FIG.4H
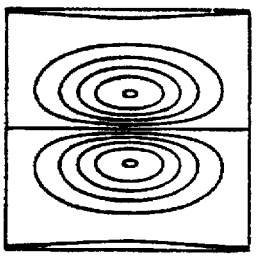 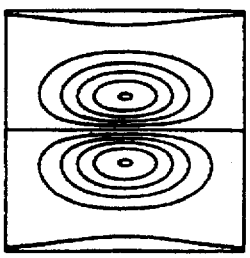 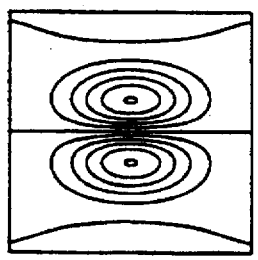 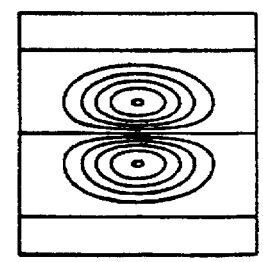
FIG.5A  FIG.5B  FIG.5C  FIG.5D

SCALE SPECIFIC AND ROBUST LINE/EDGE ENCODING OF IMAGES

FIELD OF THE INVENTION

The present invention relates to the field of image encoding and, more particularly, to a mechanism for encoding and detecting local lines and edges within an image.

BACKGROUND AND SUMMARY OF THE INVENTION

A central problem in computer vision and pattern recognition is how to make an image structure explicit. One goal of image processing practitioners is to provide a signal-to-symbol converter that transforms raw pixel data into a set of probabilistic assertions about what is represented in the image. In addition to making the structure in the original image explicit using as few terms as possible, the input representation should capture invariances and describe the morphology of the image in a computationally efficient format.

As is well understood in image analysis technology, most of the structural information in an image (including gray-scale images) resides in lines and edges within the image. Currently employed line/edge detection operators typically perform prescribed convolution-type operations, translating a kernel one pixel at a time. In addition to being computationally intensive, this approach usually results in scales of detected lines or edges that are directly dependent upon the resolution of the original image. Another problem with such conventional approaches is the fact that their noise immunity is relatively low, especially when the noise corresponds to high frequency details of the image.

One proposal for obtaining efficient encoding of an image is to use non-orthogonal transforms, such as a two-dimensional Gabor transform, as described, for example in an article by J. Daugman, entitled: "Complete Discrete 2-D Gabor Transforms by Neural Networks for Image Analysis and Compression," IEEE Transactions on Acoustics, Speech, and Signal Processing, Vol. 36, No. 7, Jul. 1988.) In this article, the author proposes using Gabor transforms to provide efficient encoding of an image by extracting and exploiting correlations in ordinary images, such as similar luminance values, oriented edge continuation, and homogeneity of textural signature. The Gabor transforms essentially encode an input image in a highly compressed manner, yet still allow for acceptable reconstruction of the image. The article also presents a detailed discussion of the Gabor wavelets and their application to image signals.

SUMMARY OF THE INVENTION

The present invention is operative to take advantage of the properties of Gabor transforms and provides a new and improved method of detecting line/edges in an original image, which is independent of the resolution of the original image, has high noise immunity, and is computationally efficient.

In particular, the present invention provides a method of image encoding, which employs the following sequence of steps. First an original image is digitized to some prescribed spatial resolution (pixels per line by number of lines) and digital encoding resolution (bits per pixel) to produce a digital representation of the original image. The digital image is then analyzed to estimate directional energy and position of linear structures in the original image. These linear structures are then subjected to global and local normalization. Then spatial and directional competition are carried out among the linear structures to determine winners of this competition. The winners are then encoded into strings of digital data words (e.g. bytes), with the encoded winners forming a structural description of the original image. The structural description may be used for character recognition by, for example (match)-comparing it with stored image representations, in order to recognize an original image, such as an alpha-numeric character, with an indication of the results of the comparison being provided.

Pursuant to this methodology, rather than search for pixels belonging to lines or edges, as in the prior art, the present invention calculates an estimate of local line/edge position and direction together with an associated confidence level. To avoid convolutions with rotated and scaled edge-detecting kernels, projections of the original image onto a specified discrete basis set of two-dimensional filters are determined. The two-dimensional filters used in the process model their shifted, rotated, and scaled copies with the aid of associated linear combinations. Two-dimensional Gabor wavelets have the necessary properties. Advantageously, the contour structure of the original image may be encoded in dependence upon the chosen scale, but independent of the resolution of the image and being practically immune to noise.

BRIEF DESCRIPTION OF THE DRAWINGS

FIGS. 1A–1D depict contour plots of a sine-type Gabor wavelet (1A) and its 10:1 (1B), 9:2 (1C), and 8:3 (1D) combinations with a cosine-type wavelet;

FIGS. 2A–2D illustrate horizontal (2A) and vertical (2B) wavelets and their 1:1 (2C) and 2:1 (2D) combinations;

FIGS. 3A–3D show horizontal (3A), 12° (3B) wavelets and their 1:1 (3C) and 2:1 (3D) combinations;

FIGS. 4A–4H illustrate linear combinations of large and small wavelets (scale ratio 4), having coefficient ratios of: 1:0 (4A), 2:1 (4B), 1:1 (4C), 2:3 (4D), 1:2 (4E), 1:4 (4F), 1:8 (4G), 0:1 (4H);

FIGS. 5A–5D show linear combinations of large and small wavelets with a scale ratio of $(2)^{1/2}$. The ratios of coefficients: 1:1 (5A), 1:2 (5B), 1:8 (5C), 0:1 (5D);

DETAILED DESCRIPTION OF THE INVENTION

Figure 6A:
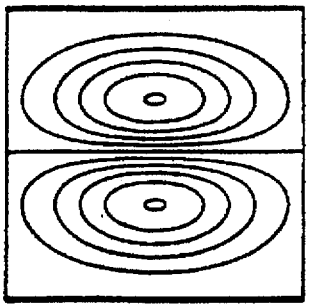
FIGS. 6A–6I depict different linear combinations of four sine-type wavelets.

Before describing in detail the new and improved image encoding mechanism in accordance with the present invention, it should be observed that the present invention resides primarily in what is effectively a prescribed digital image processing technique that may be implemented by means of conventional digital signal processing circuitry, or may be embedded within image processing application software executable by the control processor of a digital image processing workstation, through which images are processed. The sources of such images may be conventional imaging hardware, and are not considered part of the invention.

Consequently, the manner in which such image sources are interfaced with either hardwired digital circuit components or a digital image processing workstation have been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

As described briefly above, in accordance with the present invention, a Gabor basis set is used for edge and line detection. In order to facilitate an understanding of the manner in which Gabor wavelets are employed it is considered useful to examine some of their characteristics. Two-dimensional Gabor wavelets have some unusual properties, including the ability to model rotated, scaled, and shifted versions of themselves with linear combinations of a discrete basis set. In other words, two-dimensional Gabor wavelet filters are approximately steerable, scalable, and shiftable. A Gabor wavelet is a Gaussian, modulated by sine (or cosine) wave. In its most general complex form, the Gabor function is an impulse response function $G(x,y)$, defined as:

$$G(x,y) = \exp(-\pi[(x-x_0)^2\alpha^2 + (y-y_0)^2\beta^2]) \times \exp(-2\pi i[u_0(x-x_0) + v_0(y-y_0)]).$$

In the above formula, there are two position parameters; $x_0$ and $y_0$, two modulation parameters; $u_0$ and $v_0$, and two scale parameters; $\alpha$ and $\beta$. In the simplest case, there are just two basic wavelets:

$$G_{sin}(x,y) = \sin(2\pi x/T) \exp(-[x^2+y^2]/\sigma^2),$$

$$G_{cos}(x,y) = \cos(2\pi x/T) \exp(-[x^2+y^2]/\sigma^2).$$

Other wavelets are shifted, rotated, and dilated versions of these two basic wavelets. Usually, dilation is repeated several times with the same factor, and the wavelets therefore form distinct size levels. The building of a basis set for a Gabor transform requires a choice of certain parameters. These include the number of size levels, the number and coordinates of corresponding centers, the number of orientations, as well as $\sigma$ and period $T$ of the wavelets.

A reduction in entropy of the image is achieved after the Gabor transform and is dependent on the ability of linear combinations of the basis wavelets to extract important features of natural scenes, especially edges and lines of different scales. A sine wavelet can serve as an elementary edge detector, while a cosine wavelet is similar to bar detectors in the cortex of a human. In accordance with the present invention, however, the entire basis set can be useful only if the orientation, position, and size of line/edge detectors can be adjusted with the aid of linear combinations of basis wavelets.

The shifting of an edge, the rotation of an edge, and the rescaling of an edge are illustrated in FIGS. 1–5. As shown in FIGS. 1A–1D, a combination of a sine and a cosine wave with arbitrary coefficients produces another wave, but with a phase shift. Using this property, an edge is easily moved orthogonally to its orientation. This can be done smoothly in the vicinity of the center of the Gaussian envelope of the wavelets. This provides a shift in the edge.

A change in orientation (edge rotation) occurs, if two sine wavelets of different orientation are combined. The orientation of the edge at the center will be rotated according to the ratio of the coefficients, as it follows from the linearity of the gradients. If vertical and horizontal wavelets are combined, as shown in FIG. 2A–2D, a wave interference pattern is present with intensity bumps all over the image. For a prescribed combination of $\sigma$ and period $T$, less distorted rotated versions of the wavelets are produced as the angle between the orientations is decreased. If the basis wavelets are spaced 10° to 15° apart, as shown in FIG. 3A–3D, there is very little distortion.

Changes in the size of the wavelets (edge rescaling) having the same phase and orientation are shown in FIGS. 4 and 5. For scale ratios as large as 2:1, such linear combinations of wavelets of different sizes but the same phase and orientation are substantially like dilated version of the basic wavelets. Using different coefficients, the present invention provides a model of a smooth dilation from a small kernel to a large kernel. This is an unexpected property since the combination: a sin $(x)$+b sin $(\tau x)$ does not have any convenient mathematical properties, and different widths of Gaussian envelopes complicate this analysis even further.

For larger scale ratios, this effect disappears, as illustrated in FIGS. 4A–4H, in which the large wavelet grows a small wavelet bubble on its side, and the bubble grows and finally absorbs the large wavelet completely. For a scale ratio $(2)^{1/2}:1$, however, the model is nearly perfect. This is shown in FIGS. 5A–5D using the coefficients 1:1, 1:2, 1:8 and 0:1. In all of these figures, the amplitude of the resulting function was normalized into [-1;1] for display purposes.

Figure 6B:
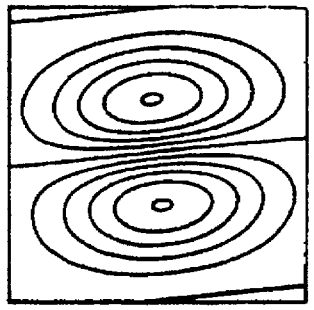
Figure 6C:
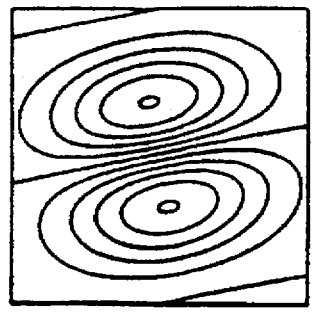
Figure 6D:
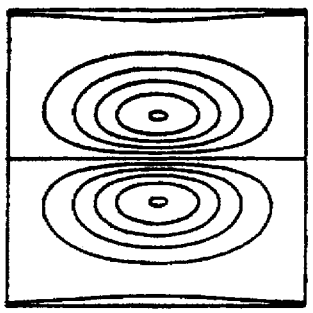
Figure 6E:
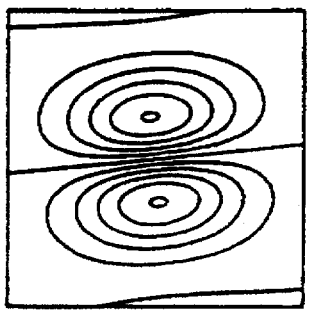
Figure 6F:
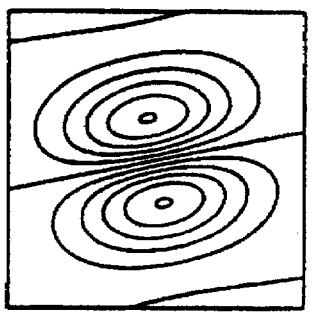
Figure 6G:
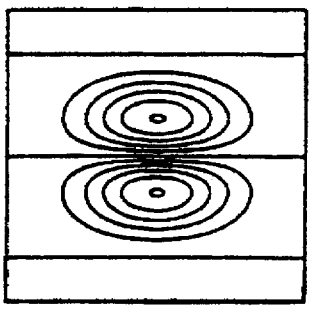
Figure 6H:
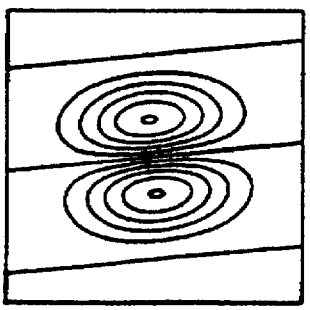
Figure 6I:
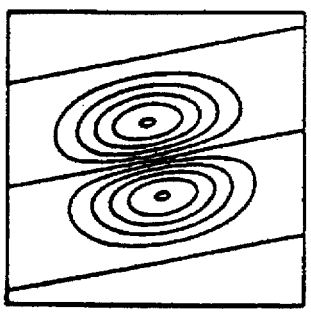

The quality of approximation achieved by separate models of smooth rotation and dilation allows linear combinations of linear combinations to demonstrate the same properties. For example, the arithmetic average of four corner wavelets, as shown in FIGS. 6A–6I, has both intermediary size and orientation. Four sine-type Wavelets are shown in FIGS. 6A–6I. A large horizontal wavelet is shown in FIG. 6A, a large rotated wavelet is shown in FIG. 6E, a small horizontal wavelet is shown in FIG. 6G, and a small rotated wavelet is shown in FIG. 6I. FIG. 6B shows the average of FIGS. 6A and 6E, FIG. 6H shows the average of FIGS. 6G and 6I; FIG. 6D shows the average of FIGS. 6A and 6G; FIG. 6F shows the average of FIGS. 6C and 6I; and FIG. 6E shows the average of FIGS. 6A, 6E, 6G and 6I. In FIG. 6A–6I, the difference in orientation is 12°, the scale ratio equals $(2)^{1/2}$.

In accordance with the present invention the parameters of the basis Gabor wavelets are chosen in such a way that their linear combinations permit continuous adjustment of their size, spatial coordinates, and orientation. Although only sine wavelets are illustrated in FIGS. 1–6, similar results can also be achieved with cosine wavelets.

A non-orthogonal basis set of line/edge detectors is thus obtained which permit the calculation of projections on shifted, rotated, and rescaled versions of themselves without repetitive convolutions. The number of original convolutions depends on the number of basis wavelets which will vary with the intended application.

Figures 10, 11:
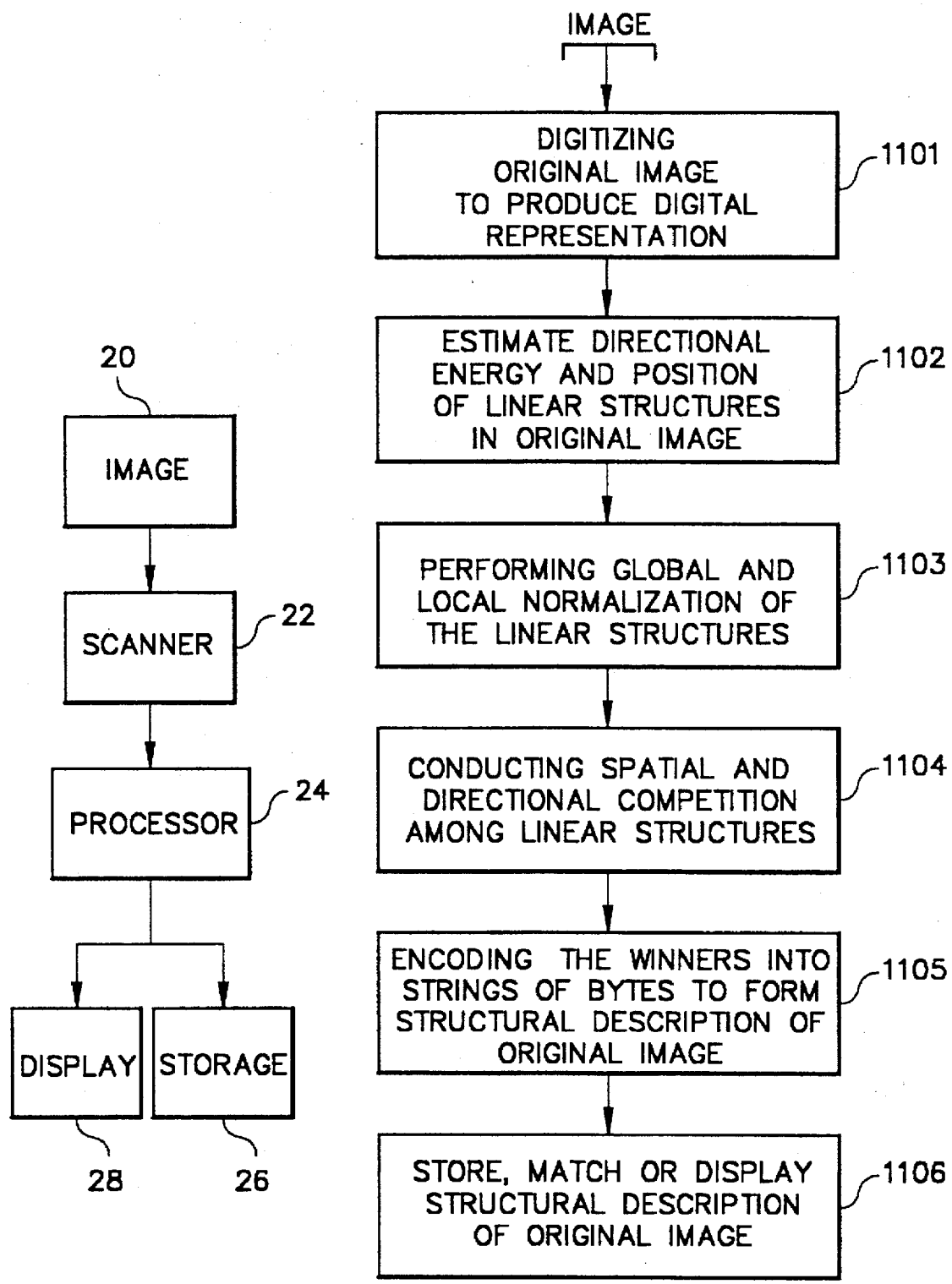
FIG. 10 diagrammatically illustrates a system for executing the image processing mechanism in accordance with the present invention.
FIG. 11 is a flow chart showing processing steps of the present invention.

FIG. 10 illustrates a block diagram of an image processing system which is operative to perform the method of the present invention. In the system of FIG. 10, an original image 20 is scanned by a conventional optical scanning device 22, which provides as its output a digital image having a prescribed spatial resolution (a number of n pixels per line by m lines per image) and digital encoding resolution (e.g. eight bits per pixel) to a digital image processing workstation 24, which contains an associated framestore and image processor, application software for which executes the sequence of processing steps of the present invention as described herein. Within workstation 24, the structural information from the original image 20 is extracted and compactly encoded.

The encoded structural information can be stored in an auxiliary storage device 26, or the symbolic data encoding the image structure can be presented for human visualization via a display device 28. The structural information can also be used by high level algorithms, such as image recognition.

The structural information that is required from the original image is a list of points in the image where lines or edges of a selected scale can be reliably detected, together with the direction of corresponding linear structures and an estimate of their confidence level. Such information may be applied as inputs to higher level image processing algorithms, e.g. those employed for pattern recognition (details of which do not form the subject of the present invention).

To encode the structure of an image, an analysis of projections of an image onto a special basis set of two-dimensional Gabor functions is carried out. The basic steps used to conduct structural encoding involve an estimation of directional energy and position, followed by global and local normalization, spatial and directional competition, and finally, encoding and visualization.

In the course of analyzing the image 20, the processor within workstation 24 preferably employs an N×N grid of local image processing centroids. (In the sample image set of FIG. 7, N=7, corresponding to 49 centroids or centers of local processing; in the sample image set of FIG. 8, N=15, corresponding to 225 centers of local processing.

Geometrically distributed around each of the centers of local processing are a plurality (e.g. thirty-two) of Gabor wavelets. In a preferred embodiment, a respective Gabor wavelet has one of eight possible orientations, one of two possible sizes and one of two possible phases, which provides a total of thirty-two around each center. The normalized Gabor wavelets are calculated in advance and stored in look-up tables.

In accordance with a non-limiting example, for character images having a spatial resolution of 64×64, the values of $\sigma$ and the period T for large wavelets correspond to 6 pixels and 16 pixels, respectively. The size ratio of large and small wavelets is $(2)^{1/2}$, and the distance between adjacent centers is equal to 8 pixels, in the example of FIG. 7 (N=7), and 4 pixels in the example of FIG. 8 (N=15). It should be noted that these parameters are exemplary only, and may be changed for a given application.

Referring now to the image processing flow sequence of FIG. 11, after converting an original image into digital format in step 1101, local processing, namely estimating the directional energy for different localities in the image is performed in step 1102 in order to provide encoded structural information. For this purpose, it is necessary to know the dependency of the characteristic size and amplitude of the models for wavelets of intermediary sizes and orientations on the coefficients of linear combinations of the basis wavelets. This determination is simplified because rotation can be modeled independently of scaling.

In the following discussion, the manner in which coefficients for rotation modeling are determined will be initially described, followed by a determination of coefficients for size modeling, and finally by size determination.

To determine coefficients for rotation modeling, the values $G_1$ and $G_2$ are used to denote two rotated versions of the same two-dimensional Gabor wavelet, either sine or cosine type. Assuming that these quantities are normalized, i.e., $\|G_i\|=1$, then their inner product may be denoted by $g=(G_1, G_2)<1$. If the angle between the wavelets is small, and if a,b is greater than or equal to 0, then the linear combination $G=aG_1+bG_2$ is effectively indistinguishable from the same wavelet rotated according to the ratio of the coefficients. The normalization is straightforward as:

$$\|G\|^2 = a^2 + b^2 + 2abg.$$

For the parameter setting specified earlier, a direct calculation results in g=0.885 for sine-type wavelets, and g=0.912 for cosine-type wavelets. Since the vector norm of the linear combination is required to equal one, the actual coefficients should be $a/\|G\|$ and $b/\|G\|$.

In order to determine the coefficients for size modeling, it will be assumed that $G_L$ and $G_s$ denote larger and smaller normalized versions of the same wavelets. For a small enough size ratio, the linear combination $G=aG_L+bG_s$ appears to be similar to a scaled wavelet. The normalization factor can be computed in the same way as for rotation, namely: $\|G\|^2=a^2+b^2+2abg$, where $g=(G_L,G_s)$. The direct calculation results in g=0.860 for sine-type wavelets and g=0.879 for cosine-type wavelets.

To estimate the characteristic size (the quantity of the Gaussian envelope) of the wavelet modeled by G, it may be recalled from the previous equations that the Gabor wavelets are sine and cosine modulated Gaussians, denoted as:

$$G_{sin}(x,y) = \sin(2\pi x/T)\exp(-[x^2+y^2]/\sigma^2),$$

$$G_{cos}(x,y) = \cos(2\pi x/T)\exp(-[x^2+y^2]/\sigma^2).$$

Since the ratio of the period and $\sigma$ is constant for all scales, the above equations can be rewritten as:

$$G^\sigma{}_{sin}(x,y) = \sin(p\,x/\sigma)\exp(-[x^2+y^2]/\sigma^2) = G_{sin}(x/\sigma,y/\sigma),$$

$$G^\sigma{}_{cos}(x,y) = \cos(p\,x/\sigma)\exp(-[x^2+y^2]/\sigma^2) = G_{cos}(x/\sigma,y/\sigma).$$

As described earlier, a linear combination of a larger and a smaller wavelet approximates a wavelet of an intermediary size as:

$$aG_{sin}(x/\sigma_L, y/\sigma_L) + bG_{sin}(x/\sigma_s, y/\sigma_s) = cG_{sin}(x/\sigma_{sin}, y/\sigma_{sin}),$$

$$aG_{cos}(x/\sigma_L, y/\sigma_L) + bG_{cos}(x/\sigma_s, y/\sigma_s) = dG_{cos}(x/\sigma_{cos}, y/\sigma_{cos}).$$

The following two equations are useful:

$$\|G(x/\sigma,y/\sigma)\| = \sigma\|G(x,y)\|, \tag{1}$$

since $\|G(x/\sigma,y/\sigma)\|^2 = \iint G^2(x/\sigma, y/\sigma)dxdy = \sigma^2 \iint G^2(x/\sigma,y/\sigma)dx/\sigma dy/\sigma = \sigma^2\|G(x,y)\|^2.$ $$\partial/\partial x[G_{sin}(x/\sigma,y/\sigma)]_{x,y=0} = p/\sigma,$$

since $\partial/\partial x[G_{sin}(x/\sigma,y/\sigma)] =$ $\partial/\partial x[\sin(px/\sigma)\exp(-[x^2+y^2]/\sigma^2)] =$ $\partial/\partial x[\sin(px/\sigma)]\exp(-[x^2+y^2]/\sigma^2) +$ $\partial/\partial x[\exp(-[x^2+y^2]/\sigma^2)]\sin(px/\sigma). \tag{2}$ The system of equations on the amplitude correction factor c and on the $\sigma$ of the sine-type intermediary wavelets is:

$$\|aG_{sin}(x/\sigma_L, y/\sigma_L) + bG_{sin}(x/\sigma_s, y/\sigma_s)\|^2 =$$

$$\|cG_{sin}(x/\sigma_{sin}, y/\sigma_{sin})\|^2$$

$$\partial/\partial x[aG_{sin}(x/\sigma_L, y/\sigma_L) +$$

$$bG_{sin}(x/\sigma_s, y/\sigma_s)]_{x,y=0} =$$

$$\partial/\partial x[cG_{sin}(x/\sigma_{sin}, y/\sigma_{sin})]_{x,y=0}.$$

Thus, $a^2\sigma_L^2 + b^2\sigma_s^2 + 2ab\sigma_L\sigma_s g_{sin} = c^2\sigma_{sin}^2$ $a/\sigma_L + b/\sigma_s = c/\sigma_{sin}$ The system of equations on the amplitude correction factor d and on the $\sigma$ of the cosine-type wavelets is:

$$\|aG_{cos}(x/\sigma_L, y/\sigma_L) + bG_{cos}(x/\sigma_s, y/\sigma_s)\|^2 = \|dG_{cos}(x/\sigma_{cos}, y/\sigma_{cos})\|^2$$
$$aG_{cos}(0,0) + bG_{cos}(0,0) = dG_{cos}(0,0).$$

The second equation is the result of substitution of x,y=0 in the formula for a linear combination of the cosine-type wavelets. Finally, $$a^2\sigma_L^2 + b^2\sigma_s^2 + 2ab \sigma_L\sigma_s g_{cos} = d^2\sigma_{cos}^2 \quad a+b=d$$

Since there are two independent systems of two equations with two different pairs of unknowns, they can be solved analytically.

The characteristic size of a sine-type wavelet combination was estimated as being approximately equal to that of a cosine-type wavelet combination with the same coefficients a and b, that is $\sigma_{sin} \approx \sigma_{cos}$. Indeed, in the particular exemplary embodiment described above, when $\sigma_L/\sigma_s = (2)^{1/2}$ and $g_{sin} = 0.860$, for all possible combinations of a and b, the solution to the first pair of equations results in such a value of c that $0.995 < (a+b)/c < 1.001$.

This property effectively means that c=a+b; as a consequence, c=d. Since $g_{sin}$ is approximately equal to $g_{cos}$, it was concluded that $\sigma_{sin}$ is approximately equal to $\sigma_{cos}$; these two can be represented by just one common $\sigma$. Only a single equation is needed to determine its value. Specifically, $$a/\sigma_L + b/\sigma_s = (a+b)/\sigma.$$

In other words, the inverse sigma of the linear combination is equal to the same linear combination of the inverse sigmas.

The final result is $\sigma = \sigma_L\sigma_s(a+b)/(a\sigma_s + b\sigma_L)$. This approximation is used in a preferred embodiment of the invention.

The error measure chosen to characterize the quality of approximation of a rotated or scaled wavelet G by an appropriate linear combination of basic wavelets F is their dot product.

Letting $\|G\|=1, \|F\|=1$, then $G \cdot F = \cos \delta$. This angle $\delta$ can be visualized as the angle between these two unit vectors in the functional linear space, and it reveals how far F can deviate from G. The quality of approximation is reflected in the value of $\delta$, which must be rather small. This error measure is convenient, since elementary trigonometry provides bounds on errors for projections onto F instead of G based on the value of $\delta$. If it is assumed that the input image is normalized, then its projections onto G and F can also be interpreted as $\cos \alpha$ and $\cos \beta$ for the appropriate $\alpha$ and $\beta$. The error, that is, the absolute value of the difference between the projections, can be estimated as:

$$\text{error} = |\cos \beta - \cos \alpha| = 2|\sin((\alpha+\beta)/2) \sin((\alpha-\beta)/2)| < 2 \sin \delta/2.$$

The last inequality holds, since $|\alpha - \beta| < \delta$. The value of the principal error measure $\delta$ depends on the choice of $\sigma$ and period of the basic wavelets; however, the "spacing" between them is far more important. The errors also depend on the coefficients of a particular linear combination and, in general, the errors are the largest for models halfway between the basic wavelets.

In Tables 1 and 2, below, error means the maximum error over all possible linear combinations with positive coefficients. Table 1 summarizes rotation modeling errors as a function of the angle between the basic wavelets. Similarly, Table 2 presents size modeling errors as a function of the scale difference between the larger and the smaller basic wavelet. In both cases the values of $\sigma$ and period are the same 6 and 16 pixels for 64×64 images as elsewhere in this paper. It should be noted that the errors are slightly different for sine and cosine-type wavelets.

TABLE 1

Rotation Modeling Errors

| Angle (°) | Wavelet Type | G · F | δ (°) | Error |
|---|---|---|---|---|
| 90.0 | Sine | 0.86331 | 30.31 | 0.6413 |
| | Cosine | 0.83399 | 33.49 | 0.7178 |
| 60.0 | Sine | 0.96279 | 15.68 | 0.2728 |
| | Cosine | 0.95654 | 16.95 | 0.2948 |
| 45.0 | Sine | 0.98700 | 9.25 | 0.1613 |
| | Cosine | 0.98504 | 9.92 | 0.1729 |
| 30.0 | Sine | 0.99726 | 4.24 | 0.0740 |
| | Cosine | 0.99689 | 4.52 | 0.0789 |
| 22.5 | Sine | 0.99912 | 2.41 | 0.0421 |
| | Cosine | 0.99900 | 2.57 | 0.0448 |
| 15.0 | Sine | 0.99982 | 1.08 | 0.0189 |
| | Cosine | 0.99980 | 1.15 | 0.0200 |
| 12.0 | Sine | 0.99993 | 0.69 | 0.0120 |
| | Cosine | 0.99992 | 0.74 | 0.0129 |

TABLE 2

Size Modeling Errors

| Scale Ratio | Wavelet Type | G · F | δ (°) | Error |
|---|---|---|---|---|
| 2.0 | Sine | 0.96978 | 14.12 | 0.2459 |
| | Cosine | 0.97365 | 13.18 | 0.2296 |
| 1.9 | Sine | 0.97698 | 12.32 | 0.2146 |
| | Cosine | 0.97986 | 11.52 | 0.2007 |
| 1.8 | Sine | 0.98325 | 10.50 | 0.1830 |
| | Cosine | 0.98528 | 9.84 | 0.1716 |
| 1.7 | Sine | 0.98850 | 8.70 | 0.1517 |
| | Cosine | 0.98986 | 8.17 | 0.1424 |
| 1.6 | Sine | 0.99270 | 6.93 | 0.1208 |
| | Cosine | 0.99354 | 6.52 | 0.1137 |
| 1.5 | Sine | 0.99583 | 5.23 | 0.0913 |
| | Cosine | 0.99629 | 4.93 | 0.0860 |
| $(2)^{1/2}$ | Sine | 0.99797 | 3.65 | 0.0637 |
| | Cosine | 0.99819 | 3.45 | 0.0601 |

Once the coefficients for rotation, size modeling, and the determination of size have been provided, local processing can be performed. First, the thirty-two projections of the original image onto the local basis set are calculated. Then, projections onto both sine- and cosine-type wavelets (S and C, respectively) of intermediary sizes and orientations are estimated.

The total energy associated with each pair, $E=(S^2+C^2)^{1/2}$ is computed. This energy is disregarded in all future processing if it is below a certain threshold, or if the cosine-type projection is negative (images are supposed to be black-on-white). Since during this stage all wavelets share the same center of Gaussian envelope, line/edge phase shift can be estimated, which is equal to the arcsin(S/E). This value is divided over 2π and multiplied by the estimated period of the corresponding wavelet to obtain the actual value of orthogonal shift relative to the center.

Once the local processing step 1102 has been performed to provide an estimation of directional energy and position, global and local normalization are next carried out in step 1103. All the energy values must be normalized before they can be used to encode the structural information. This procedure is similar to what is known about biological vision, and allows the methodology of the present invention to be invariant to the brightness of the gray-scale image or to the thickness of contour lines in the binary image.

In accordance with the invention, each energy value is divided over the maximum of these values in the whole image. Thresholding then removes the lower energy projections. Although an exemplary value of a threshold is 0.15, but this number can be changed depending on the application.

After all of the noise is removed, it is necessary to identify thin lines, even if there are thick lines in a different part of the image. This test is performed by additional local normalization in which each energy value is divided over the maximum of these values in a small window containing processing centers immediately adjacent to the current one.

The next step, shown at 1104, is a competition step, in which high energy local projections attempt to inhibit each other. This is another concept from biological vision. In principle, mutual inhibition should decrease gradually with the distance and with the difference in angle for the local projections, but for simplicity, the competition is organized in stages.

First, all projection pairs with less than 0.5 energy of local maximum are thresholded out. In a preferred embodiment of the invention, projections are estimated into a prescribed number of intermediary sizes (e.g. 8) and directions of wavelets (e.g. 128), so that the next stage of the process of the present invention involves projection onto wavelets of different sizes; only the highest energy pairs survive for each intermediary direction. The last stage of competition is global in which local maxima of energy are searched for both in terms of direction and space coordinates.

The competition described above results in a set of 'winners', typically on the order of 30 to 80. Their total number depends upon the length and complexity of the contour. Each of these winners can be fully characterized by a string of digital data words (e.g. a five-byte string), comprising: (x-coordinate, y-coordinate, angle, size, and energy). In step 1105, a list of these strings, which will be termed oriented pixels, is written into a file which serves as the structural description for the original image.

To verify the accuracy of the method of the present invention, this same list of strings can be visualized in an image, where each oriented pixel is represented by a short line segment drawn in the direction given by the byte "angle" at the position (x-coordinate, y-coordinate).

The last step of the process, shown at 1106, includes final encoding and display of the image. The processed images are not reconstructions in the traditional sense of an inverse transform, but rather a visualization of the symbolic data encoding the image structures.

Figure 7:
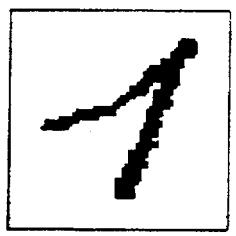
FIG. 7 depicts a set of sample original character images and their structural visualizations with orientation steps of approximately 1.5°.
Figure 7:
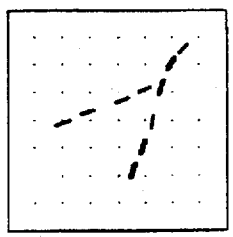
Figure 7:
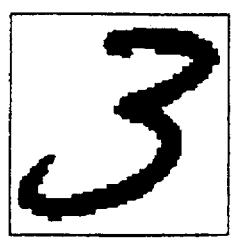
Figure 7:
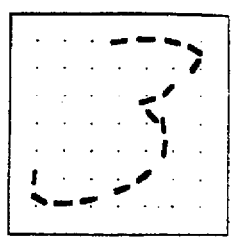
Figure 7:
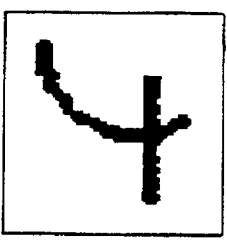
Figure 7:
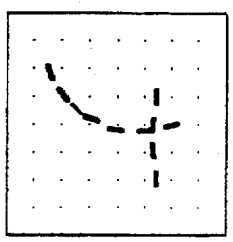
Figure 7:
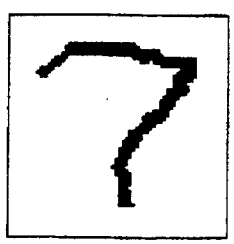
Figure 7:
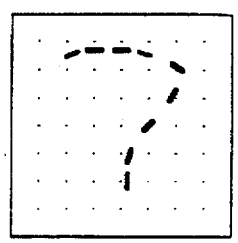
Figure 7:
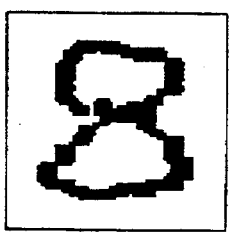
Figure 7:
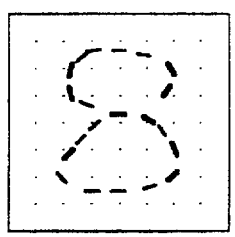
Figure 7:
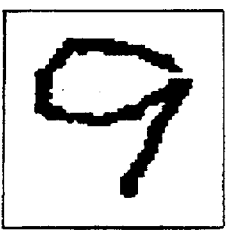
Figure 7:
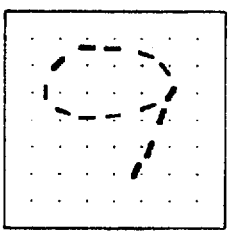
Figure 7:
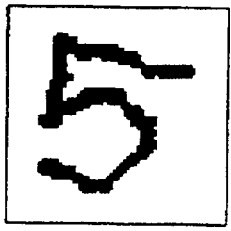
Figure 7:
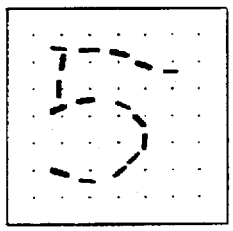
Figure 7:
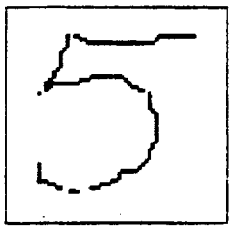
Figure 7:
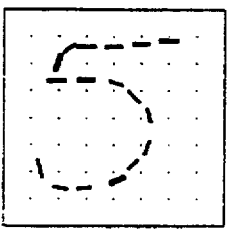
Figure 7:
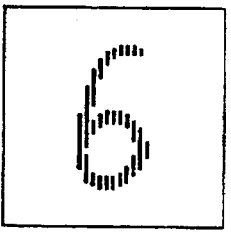
Figure 7:
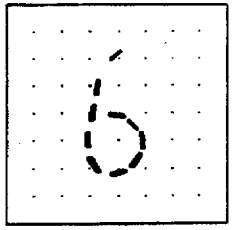
Figure 7:
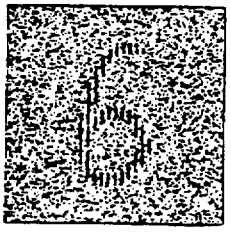
Figure 7:
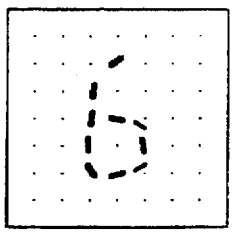
Figure 8:
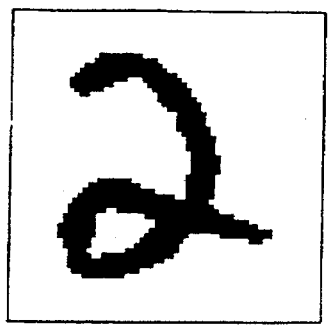
FIG. 8 depicts a set of sample original character images and their structural visualizations with orientation steps of 22.5° and a higher spatial resolution.
Figure 8:
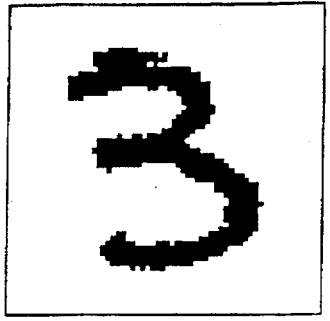
Figure 8:
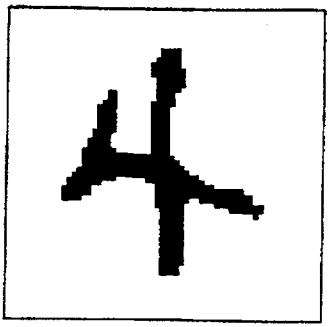
Figure 8:
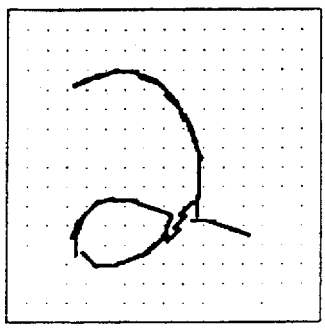
Figure 8:
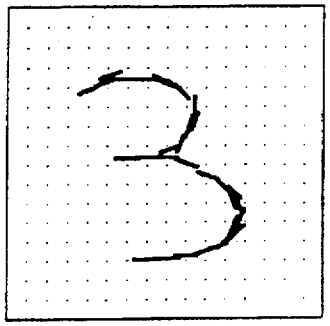
Figure 8:
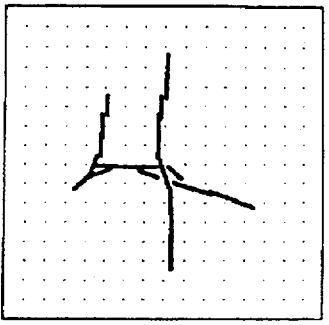
Figure 8:
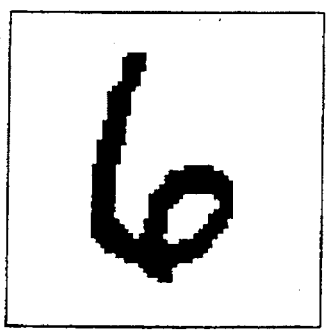
Figure 8:
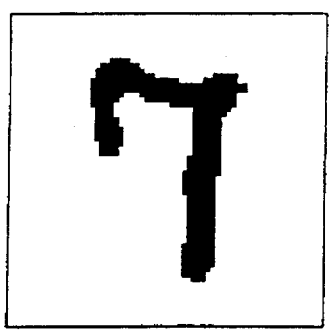
Figure 8:
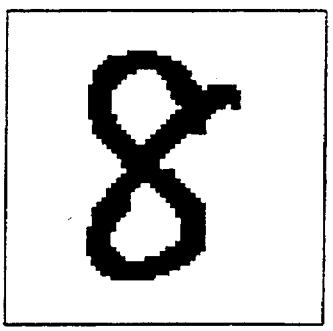
Figure 8:
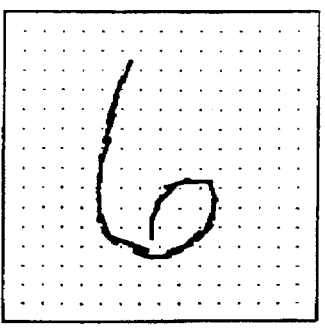
Figure 8:
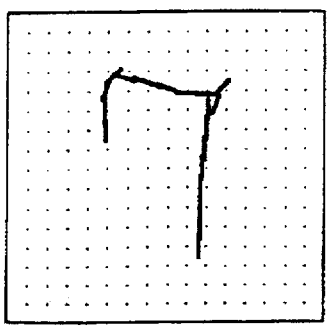
Figure 8:
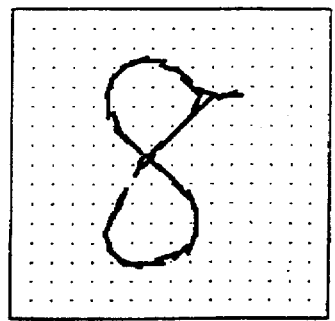
Figure 9:
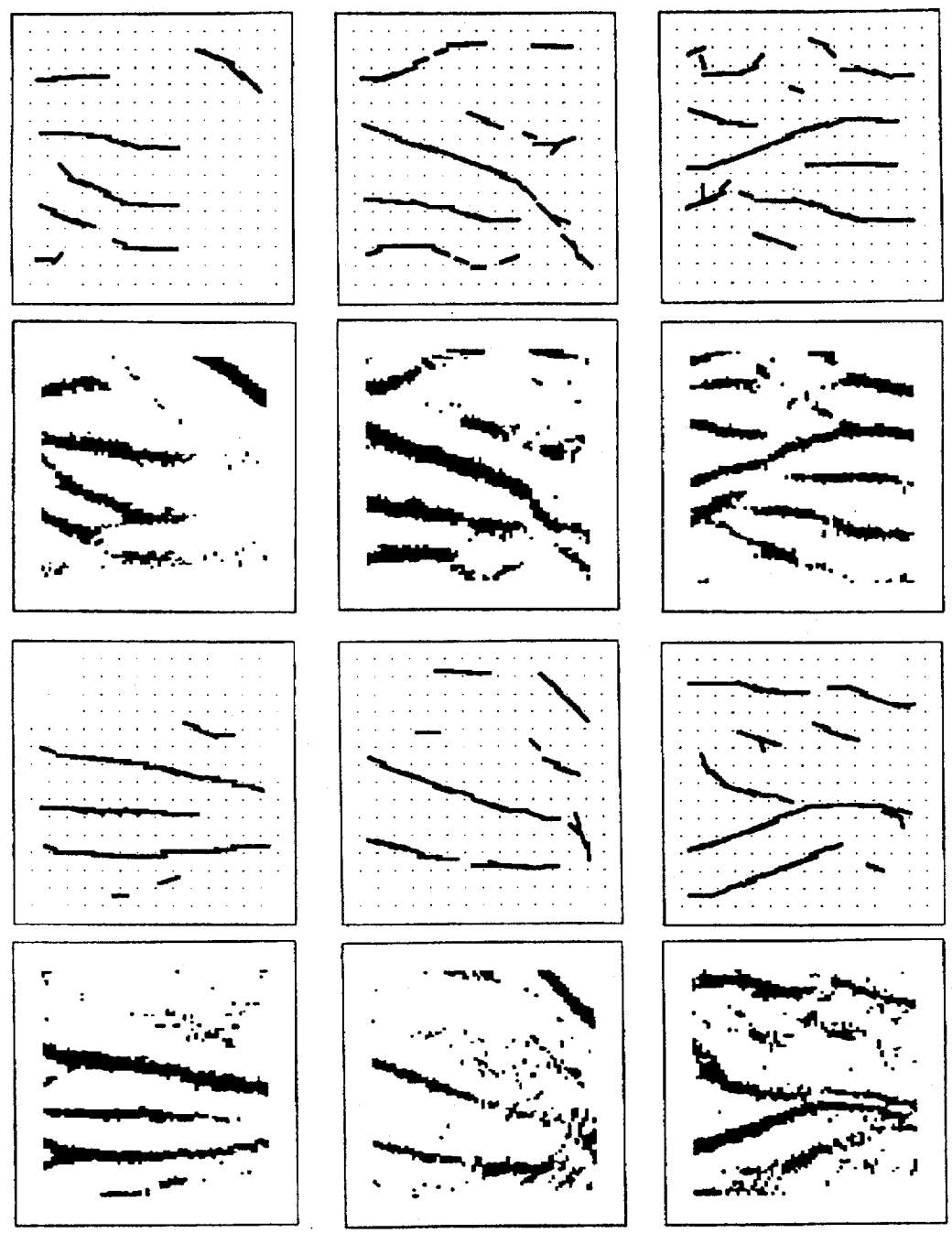
FIG. 9 illustrates the application of the present invention to a sample set of vein patterns and their structural visualizations.

The examples of FIGS. 7, 8 and 9 show original binary character images together with their visualizations. As noted above, FIG. 7 shows an exemplary set of images in which a square 7×7 grid is used with an eight pixel step. In this example, projections are estimated on wavelets of eight intermediary sizes (between the larger and the smaller with the scale ratios $(2)^{1/2}$ and sixteen intermediary orientations (between eight basic orientations), producing the total of 128 different directions less than 1.5° apart.

The width of a line segment in this set of visualization is related to the energy of the corresponding projection pair.

A comparison of the image set of FIG. 8 with that of FIG. 7 shows similar pairs of images, but the density of the processing centers in FIG. 8 is doubled, which results in a higher spatial resolution. A square grid of 15×15 centers, with a four pixel step, is used. A higher spatial resolution allows the achievement of reasonable quality of visualizations with the minimum of basis wavelets of two sizes and eight orientations. Modeling with linear combinations is used in this embodiment of the method only to estimate the coordinate shift. Since only energetic projections are left after thresholding, there is not much information in the value of "energy". This observation allows the use of three-byte strings to encode x-coordinate, y-coordinate and angle. In the visualization, all line segments have the same length and width.

FIG. 9 shows another set of images, illustrating the application of the invention to images other than optical characters. The images of FIG. 9 are vein patterns from infra-red images of the back of human hands. A vein pattern is unique and can be used as a biometric signature, for example, to control access to bank accounts, buildings, etc. Due to the higher input resolution as well as complexity of vein patterns, the parameters of the method of the present invention are adjusted in comparison to the images of FIGS. 7 and 8. In the image set of FIG. 9, originals of a 256×256 input resolution are shown with visualizations of these original images. A 15×15 grid of centers that are 16 pixels apart is shown in the figures. The quantities σ and the period T for large wavelets are equal to 21 pixels and 56 pixels respectively.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

PARTS LIST

20 - original image;
22 - optical scanning device;
24 - digital image processing workstation;
26 - auxiliary storage device;
28 - display device.

What is claimed:

1. A method of encoding lines and or edges of selectable scale in an image, comprising the steps of:

(a) capturing scale-specific line and or edge direction and position of linear structures of said image independently of resolution of said image; and (b) encoding said direction and position of said linear structures of said image into an oriented pixel representation of said image;

wherein step (b) comprises encoding said direction and position in said oriented pixel representation of said image by determining projections of said image onto a discrete basis set of two-dimensional filters, wherein said two-dimensional filters comprise wavelets of a type including Gabor wavelets, and wherein said two-dimensional filters model steerable, scaleable and shiftable line and or edge detecting kernels using linear combinations of the detecting kernels.

2. A method according to claim 1, further including the step of:
   (c) processing said oriented pixel representation of said image as encoded in step (b) to detect prescribed characteristics of said image.

3. A method of encoding an image comprising the steps of:
   (a) digitizing an original image to produce a digitized image;
   (b) processing said digitized image to obtain an estimate of direction energy and the position of linear structures in said original image;
   (c) performing global and local normalization of the linear structures obtained in step (b);
   (d) conducting spatial and directional competition among said linear structures and determining winners of said competition; and
   (e) encoding said winners into strings of digital data codes representative of encoded winners, so as to form a structural description of said original image;
   wherein step (b) includes the steps of:
      (b1) calculating a plurality of projections of said original image onto a local basis set;
      (b2) estimating projections onto sine and cosine type wavelets of intermediary sizes and orientations, wherein said sine and cosine type wavelets comprise wavelets of a type including Gabor wavelets;
      (b3) determining total energy associated with each wavelet pair;
      (b4) estimating a line/edge phase shift; and
      (b5) obtaining a value of orthogonal shift relative to a center of a Gaussian envelope from the estimated line/edge phase shift.

4. A method according to claim 3, further including the step of:
   (f) processing said structural description formed in step (e) to detect features of said original image.

5. A method according to claim 3, further comprising the step of:
   (g) displaying said winners as a function of the strings of data words to form a visualization of the structural description of said original image.

6. A method according to claim 3, wherein step (b) further comprises determining dependence of characteristic size and amplitude of models for wavelets of intermediary sizes and orientation on coefficients of linear combinations of the sine and cosine type wavelets.

7. A method according to claim 3, wherein said original image comprises an alpha-numeric character.

8. A method according to claim 3, wherein said original image comprises a vein pattern.

9. A system for encoding an image comprising:
   an image coupling mechanism which is operative to provide said image as a digitized image having a prescribed spatial resolution and a digital encoding resolution;
   a digital memory to which said digitized image is coupled for storage therein; and
   a digital image processor which is coupled to said digital memory and is operative to process said digitized image in accordance with the following image processing steps:
      (a) processing said digitized image to obtain an estimate of direction energy and the position of linear structures in said original image;
      (b) performing global and local normalization of the linear structures obtained in step (a);
      (c) conducting spatial and directional competition among said linear structures and determining winners of said competition; and
      (d) encoding said winners into strings of digital data codes representative of encoded winners, so as to form a structural description of said original image;
      wherein step (a) includes the steps of:
         (a1) calculating a plurality of projections of said original image onto a local basis set;
         (a2) estimating projections onto sine and cosine type wavelets of intermediary sizes and orientations, wherein said sine and cosine type wavelets comprise wavelets of a type including Gabor wavelets;
         (a3) determining total energy associated with each wavelet pair;
         (a4) estimating a line/edge phase shift; and
         (a5) obtaining a value of orthogonal shift relative to a center of a Gaussian envelope from the estimated line/edge phase shift.

10. A system according to claim 9, wherein said digital image processor is operative to process said digitized image in accordance with the following additional image processing step:
    (e) processing said structural description formed in step (d) to detect features of said image.

11. A system according to claim 9, further including a display device, and wherein said digital image processor is operative to cause said winners to be displayed by said display device as a function of strings of data words to provide a visualization of the structural description of said original image.

12. A system according to claim 9, wherein, in said digital image processor, step (b) further comprises determining dependence of characteristic size and amplitude of models for wavelets of intermediary sizes and orientation on coefficients of linear combinations of the sine and cosine type wavelets.

13. A system according to claim 9, wherein said original image comprises an alpha-numeric character.

14. A system according to claim 9, wherein said original image comprises a vein pattern.

* * * * *